(12) United States Patent
Weil et al.

(10) Patent No.: US 8,559,407 B2
(45) Date of Patent: Oct. 15, 2013

(54) CHARACTERIZING UNCOORDINATED INTERFERENCE OF A WIRELESS NETWORK

(75) Inventors: Kevin Weil, Redwood City, CA (US); Peter Behroozi, Stanford, CA (US); Cyrus Behroozi, Menlo Park, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 577 days.

(21) Appl. No.: 11/897,913

(22) Filed: Aug. 31, 2007

(65) Prior Publication Data

US 2009/0059873 A1  Mar. 5, 2009

(51) Int. Cl.
*H04W 4/00* (2009.01)
*H04W 72/00* (2009.01)
*H04L 12/26* (2006.01)
*H04L 12/28* (2006.01)
*H04J 3/00* (2006.01)

(52) U.S. Cl.
USPC .......... 370/338; 455/450; 455/453; 370/401; 370/252; 370/345

(58) Field of Classification Search
USPC ................... 370/338, 328; 455/423, 424, 425
See application file for complete search history.

(56) References Cited

U.S. PATENT DOCUMENTS

| 5,661,727 | A | 8/1997 | Kermani et al. |
| 7,079,609 | B2 * | 7/2006 | D'Amico et al. ............ 375/346 |
| 7,130,289 | B2 | 10/2006 | Kuan et al. |
| 7,184,407 | B1 | 2/2007 | Myles et al. |
| 2005/0213601 | A1 | 9/2005 | Ginzburg et al. |
| 2006/0046739 | A1 * | 3/2006 | Blosco et al. ................. 455/453 |
| 2006/0209842 | A1 * | 9/2006 | Creamer et al. ......... 370/395.21 |
| 2006/0268792 | A1 * | 11/2006 | Belcea ........................... 370/338 |
| 2007/0115907 | A1 | 5/2007 | Myles et al. |

* cited by examiner

*Primary Examiner* — Christopher M Brandt
*Assistant Examiner* — Muthuswamy Manoharan
(74) *Attorney, Agent, or Firm* — Brian R Short

(57) ABSTRACT

An apparatus and method of a wireless access node within a network characterizing uncoordinated interference is disclosed. One method includes the wireless node collecting air-time usage history as perceived by the wireless access node. The wireless access node receives air-time usage history as perceived by at least one neighboring wireless node. The wireless access node comparatively analyzes the collected air-time usage and the received air-time usage.

17 Claims, 6 Drawing Sheets

CHARACTERIZING UNCOORDINATED INTERFERENCE OF A WIRELESS NETWORK

FIELD OF THE EMBODIMENTS

The described embodiments relate generally to wireless communications. More particularly, the described embodiments relate to a method and apparatus for characterizing uncoordinated interference of a wireless network.

BACKGROUND

Wireless networks typically allow a wireless device to connect to the wireless networks through a base station or access point that is wired to the network. Wireless mesh networks can additionally include access points that are wirelessly connected to the network. The wireless device can transmit data packets that are received by the base station or access point and then routed through the network. The wireless network can include many base stations or access points that are each wired to the network.

Wireless networks include wireless links that are susceptible to interference. Wireless mesh networks typically include many wireless links, and therefore, can be particularly susceptible to interference. One form of interference is self interference, in which a wireless link within the wireless mesh network receives interfering signals from other wireless links of the wireless mesh network. As packets are relayed through the wireless mesh network, they can suffer from the effects of self-interference, and/or they may cause self-interference for other links within the wireless mesh network.

One wireless network configuration that results in a form of self-interference has been termed the "hidden node" condition. A hidden node condition can result when two separate wireless nodes are communicating with a third node, but cannot receive each other's transmission. That is, the third node can receive signals from each of the two separate wireless nodes, but the wireless nodes cannot receive transmission signals from each other. As a result, transmissions from each of the two separate nodes to the third node can interfere with each other. Hidden node conditions are not limited to, but can be particularly problematic in wireless mesh network that include many wireless nodes in relatively close proximity with each other.

It is desirable to have a method and apparatus for detecting hidden node conditions within a wireless network. It is additionally desirable to mitigate uncoordinated interference caused by hidden nodes, and any other device.

SUMMARY

One embodiment includes a method of a wireless access node within a network characterizing uncoordinated interference. The method includes the wireless node collecting air-time usage history as perceived by the wireless access node. The wireless access node receives air-time usage history as perceived by at least one neighboring wireless node. The wireless access node comparatively analyzes the collected air-time usage and the received air-time usage.

Another embodiment includes a method of a wireless mesh network characterizing uncoordinated interference, wherein the wireless mesh network includes a plurality of wireless nodes. The method includes each wireless node within the wireless mesh network collecting air-time usage history as perceived by the wireless access node. Each wireless node within the wireless mesh network receives air-time usage history as perceived by at least one neighboring wireless node, and comparatively analyzes collected air-time usage and the received air-time usage.

Other aspects and advantages of the present invention will become apparent from the following detailed description, taken in conjunction with the accompanying drawings, illustrating by way of example the principles of the invention.

DETAILED DESCRIPTION

Figure 1:
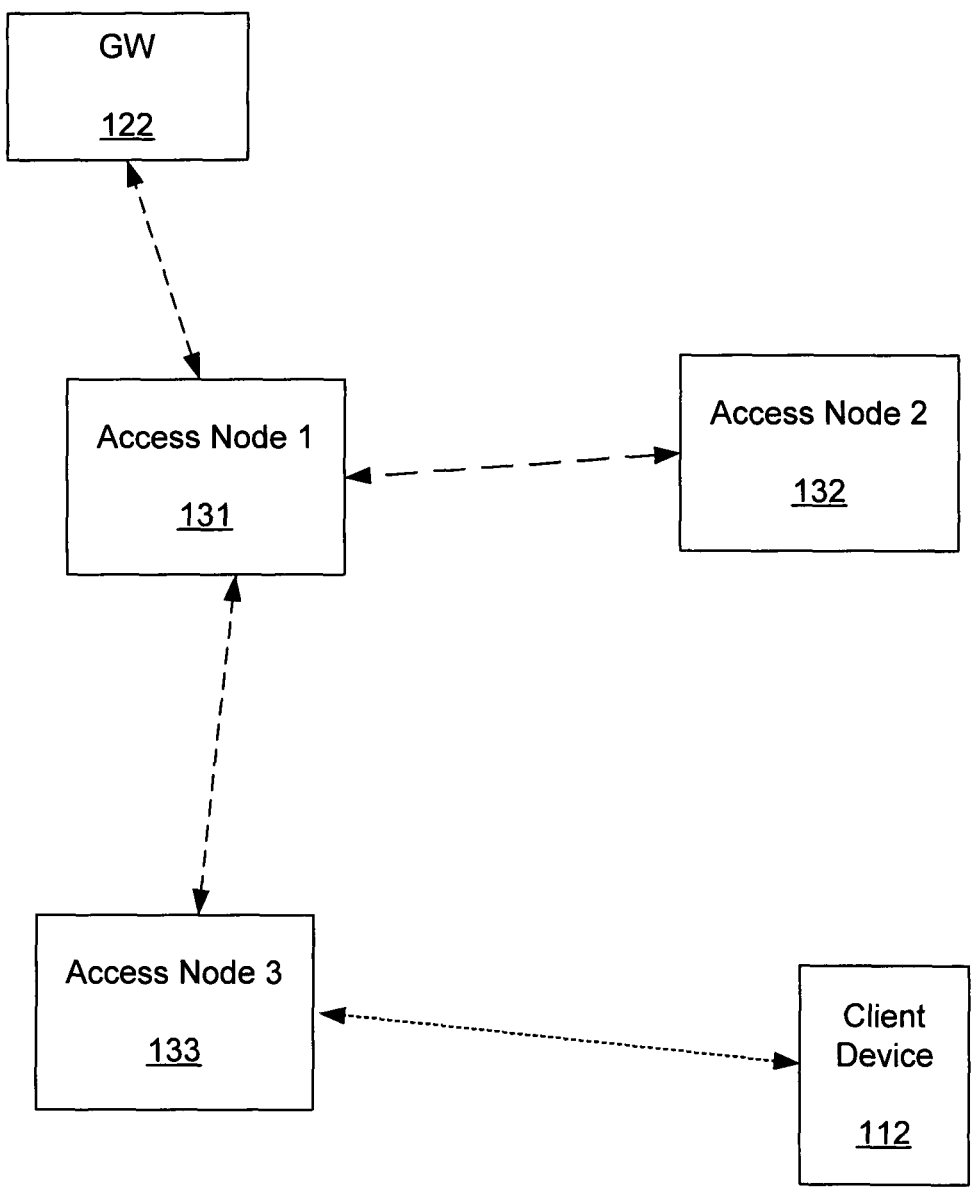
FIG. 1 shows an example of a wireless network that includes interconnected wireless access nodes.

As shown in the drawings for purposes of illustration, the described embodiments provide methods and systems for characterizing uncoordinated interference. Wireless networks, and in particular, wireless mesh networks can suffer from interference due to uncoordinated sources. The described embodiments characterize uncoordinated interference, and some embodiments include wireless nodes adjusting their operations based upon the characterized uncoordinated interference.

FIG. 1 shows an example of a wireless network that includes interconnected wireless access nodes 122, 131, 132, 133, and a client device 112. One of the access nodes is shown as a gateway 122. The gateway 122 can serve, for example, as a gateway to another network. Generally, the access nodes that have the best link quality between each other are wirelessly connected. However, conditions can occur in wireless networks in which two or more nodes can communicate with a target node, but cannot communicate within each other. In this situation, the two or more nodes can interfere with each other while attempting to communicate with the target node.

For example, access node 132, and access, node 133 can have wireless connections to access node 131, but not each other. As a result, signals transmitted from the access nodes 132 and 134 can interfere with each other when the two nodes are simultaneously attempting to transmit signals to the access node 131. The signals transmitted from one of the access nodes 132, 133 appears as uncoordinated interference to the other of the access nodes 132, 133. The uncoordinated interference can effectively result in poor wireless links between each of the access nodes 132, 133 and the wireless access node 131. Additionally, each of the access nodes 131, 132, 133 can receive uncoordinated interference from devices that are not intended to be a part of the network.

Figure 2A:
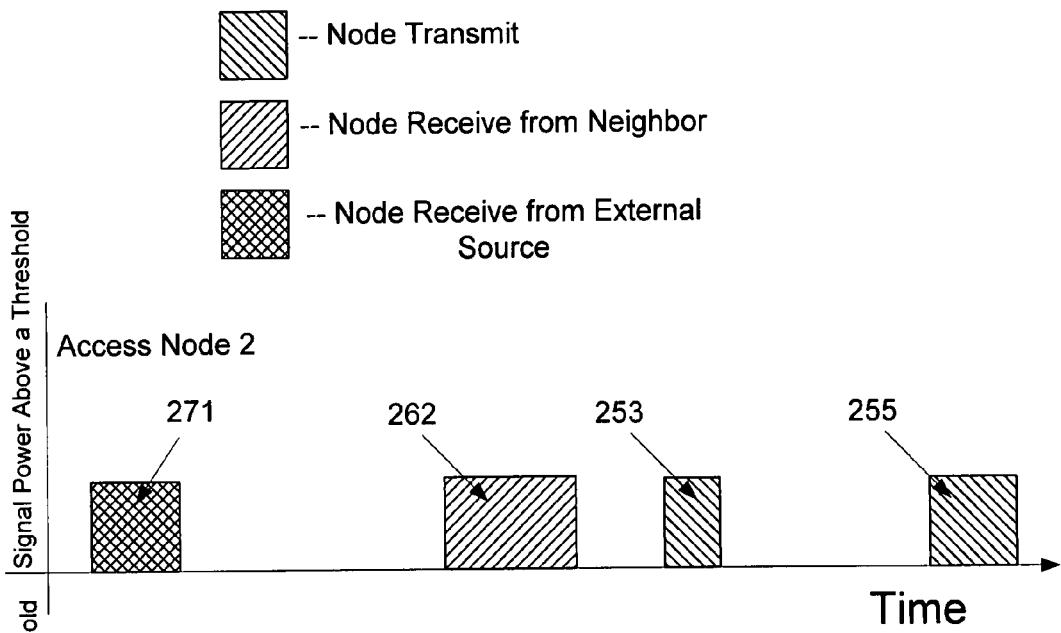
FIG. 2 shows an example of histories of air-time usage of several wireless access nodes.
Figure 2B:
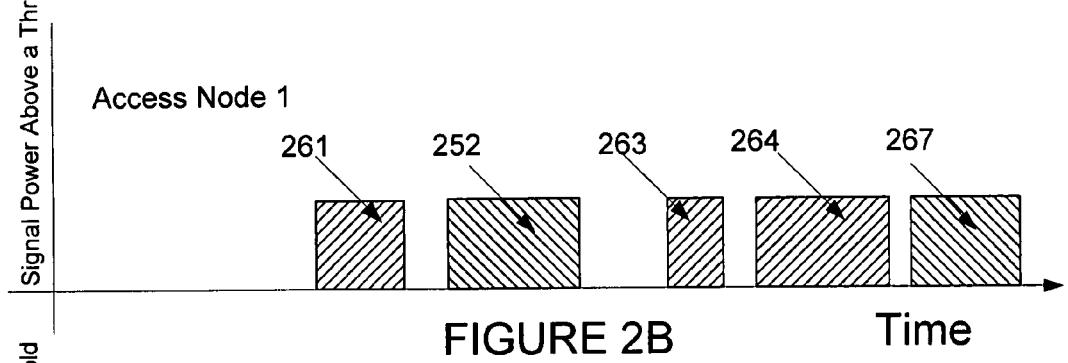
Figure 2C:
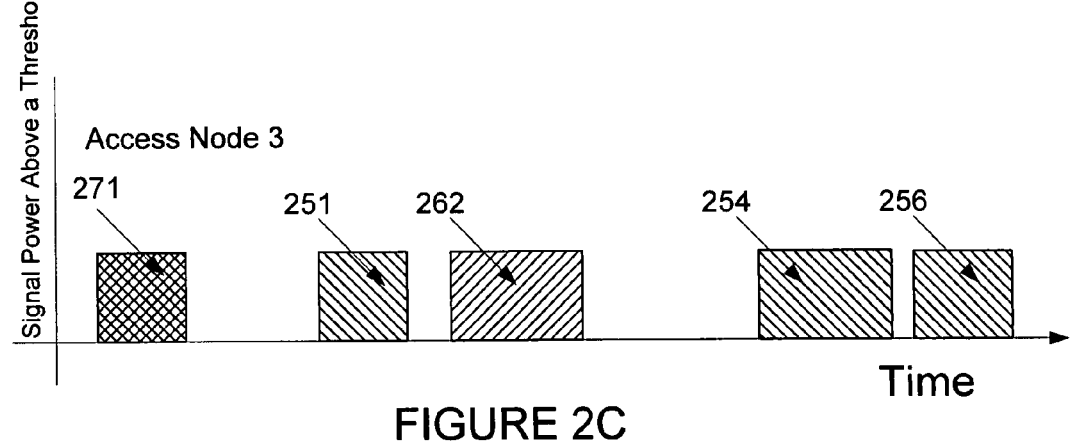

FIGS. 2A, 2B, 2C show examples of histories of air-time usage of, for example, the wireless access nodes of FIG. 1. For the description here, the air-time usage indicates air-time that is occupied (used) by signals having a power level above a threshold. The signals can be either receive or transmit signals and are typically defined by a specific wireless node. For a node, the air-time usage indicates air-time that is occupied by signals transmitted by the wireless node itself, signal transmitted by neighboring wireless nodes, and signals transmitted by other devices that may not be a part of the wireless network of the wireless node. It is to be understood that the description could alternatively include air-time availability rather than air-time usage. That is the time lines of FIGS. 2A, 2B, 2C could alternatively indicate the air-time available for each access node rather than the occupied or used air-time.

The threshold can be selected, for example, based on the interference and noise of an associated link. The threshold can be selected as the lowest signal level that impacts, for example, the bit error rate (BER) of the signals transmitted through the link. It is to be understood that the threshold can be adjustable, or can be selected from multiple available thresholds. An embodiment includes wireless nodes sharing air-time histories for multiple thresholds.

FIG. 2A shows an example of air-time usage of, for example, the second access node 132 of FIG. 1. FIG. 2B shows an example of a time line of air-time usage of, for example, the first access node 131 of FIG. 1. FIG. 2C shows an example of a time line of air-time usage of, for example, the third access node 133 of FIG. 1. The time lines indicate when signal power due to the node itself, other nodes, or any other ambient noise or external sources causes the signal power at the node to be above a threshold level. The legend of FIGS. 2A, 2B, 2C indicates portions of the time lines for each node in which the node is transmitting, when the node is receiving signals from other nodes (neighbors), and when the node is receiving signals from an external source (that is, a source that is not a part of the wireless network).

As shown, the second and third access nodes receive uncoordinated interference 271 as indicated on the time lines of FIGS. 2A and 2C. The third node transmits at time 251 and the first node receives the transmission at time 261. The first node transmits at time 252 and the second and third nodes receive the transmission at time 262. The second node transmits at time 253 and the first node receives at time 263. The third node transmits at time 254 and the first node receives at time 264. Finally, the second node transmits at time 255 and the third node transmits at time 256, both of which are received by the first node at time 267. Due to the simultaneous reception of transmission at time 255 and at time 256, the reception at time 267 of the first node include interference between the two transmissions 255, 256.

An embodiment includes each access node of the wireless network monitoring air-time usage histories similar to those shown in FIGS. 2A, 2B, 2C. Once collected, the air-time usage histories can be exchanged between the access nodes, allowing each access node to synchronize its air-time usage time line with its neighboring access nodes' air-time usage time lines. Each access node can then, based off of the air-time usage histories, project and time future transmissions. That is, for example, each access node can identify "open" time slots and time its data packet transmissions according to the open time slots.

Figure 3A:
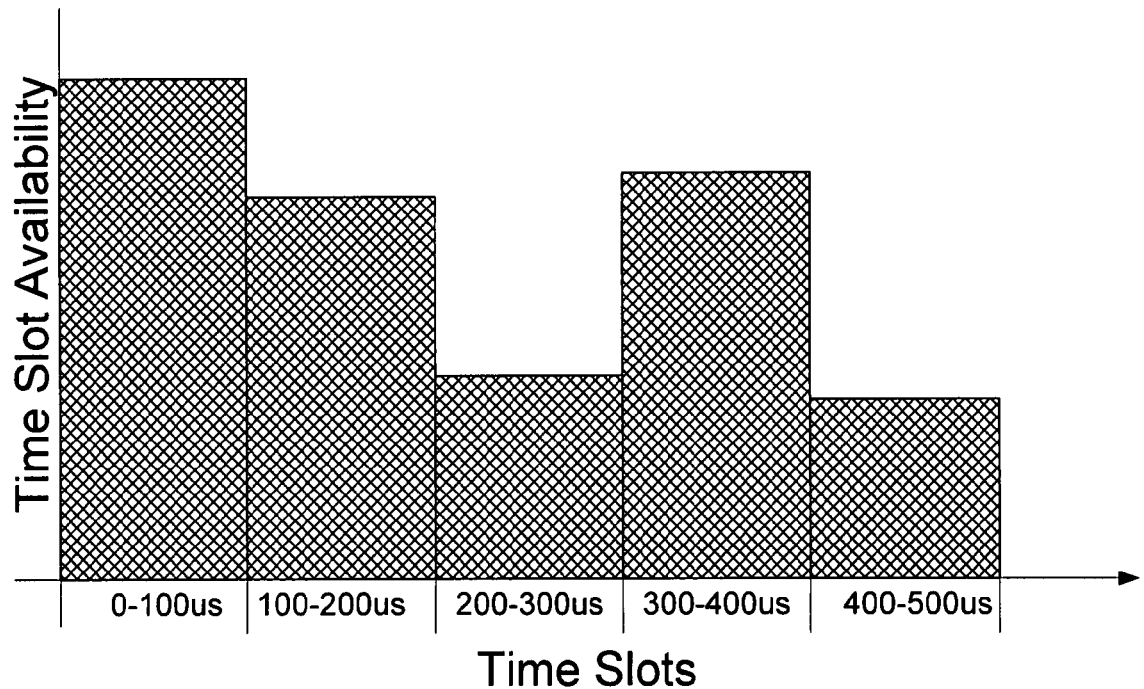
FIG. 3 shows an example of a histogram of air-time slot sizes
Figure 3B:
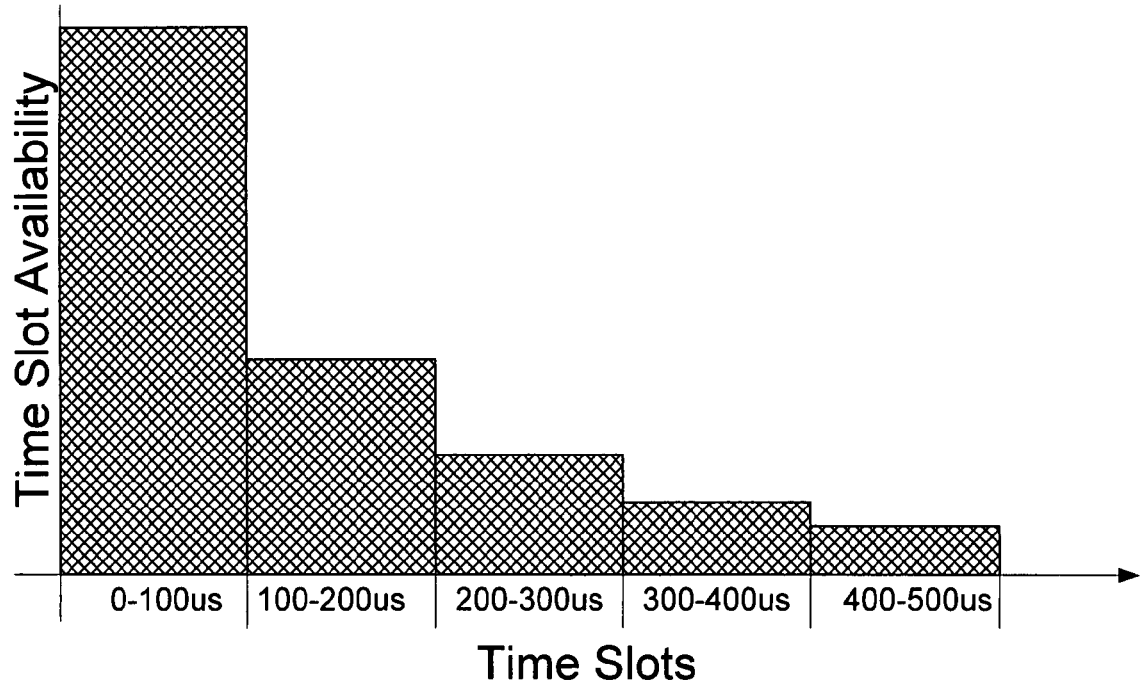

FIGS. 3A and 3B show examples of histograms of available air-time slot sizes. The histograms can be generated by the wireless access nodes based off of the monitored air-time usage histories. The histograms can be generated over periods of time, and depict the number of time slots of particular sizes (time durations) that occurred during the period of time. Based on the slot size histograms the access nodes can estimate the probability that a data packet of a particular size can be successfully transmitted from the wireless access node that generated, the histogram.

The wireless access node that generated the histogram shown in FIG. 3A may have a relatively high probability of successfully transmitting a data packet having a time duration of 350 us, whereas the wireless access node that generated the histogram shown in FIG. 3B may have a relatively low probability of successfully transmitting a data packet having a time duration of 350 us. As a result, the wireless access node that generated the histogram of FIG. 3B may decide to take action itself, or to prompt another device within the wireless network to take action to attempt to mitigate the level of uncoordinated interference received by the wireless access node.

Figure 4:
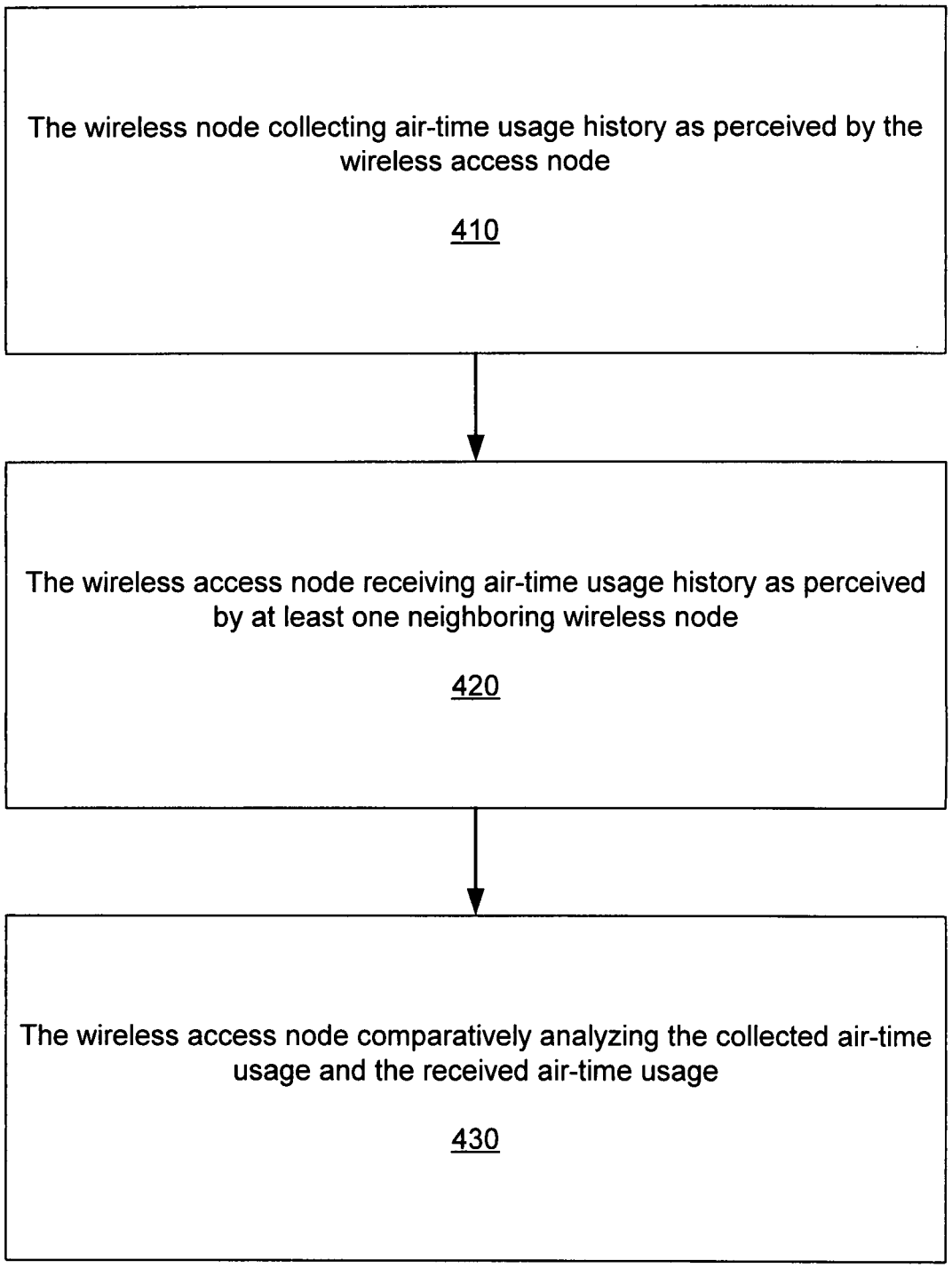
FIG. 4 is a flow chart that shows an example of steps of a method of a wireless access node within a network characterizing uncoordinated interference.

FIG. 4 is a flow chart that shows an example of steps of a method of a wireless access node within a network characterizing uncoordinated interference. A first step 410 includes the wireless node collecting air-time usage history as perceived by the wireless access node. A second step 420 includes the wireless access node receiving air-time usage history as perceived by at least one neighboring wireless node. A third step 430 includes the wireless access node comparatively analyzing the collected air-time usage and the received air-time usage. The comparative, analysis can be used to estimate an impact of uncoordinated interference on the wireless access node, or on the entire wireless mesh network.

One embodiment includes estimating a link quality between the wireless node and at least one neighboring node based on the comparative analysis. That is, if large portions of air-time include interfering transmission, or if there is very little air-time available, then the link quality can be estimated as low.

To determine available time slots the comparatively analysis can include the synchronizing the collected air-time usage and the received air-time usage. That is, the timing of the air-time usage of the different access nodes should be synchronized in order that available time slots can be identified. That is, for example, a histogram of available air-time slot sizes can be generated.

The air-time histories can be synchronized in several different ways. Generally, the collected air-time usage and the received air-time usage can be synchronized by correlating the collected air-time usage with the received air-time usage. One method of synchronizing the collected air-time usage and the received air-time usage includes XORing the collected air-time usage with the received air-time usage with several different time offsets, and using the offset which results in the least number of bits set. Other embodiments include the wireless node and neighboring wireless nodes being synchronized through the use of a network timing protocol (NTP), or by including GPS clocks within the wireless nodes.

Embodiments include influencing transmission by the wireless node based at least in part on the comparative analysis. That is, for example, based on the comparative analysis the wireless node can selecting a transmission bit rate, selecting a transmission power, and/or controlling fragmentation of transmission data packets based at least in part on the comparative analysis. Additionally or alternatively, based on the comparative analysis, the wireless node can utilize an RTS/CTS mode, select a transmission channel or a transmission link.

If the access node identifies large gaps of available air-time, the access node can increase its transmission bit rate by transmitting many bits (data packets) during the gaps. The access node can identify times in which it can be a good neighbor and reduce the interference the access node causes other access nodes by reducing its transmission power. By identifying the frequency and occurrence of slots of available air-time, the access node can break-up or fragment its transmission data, and transmit the fragmented data packets according to the available air-time slots.

Figure 5:
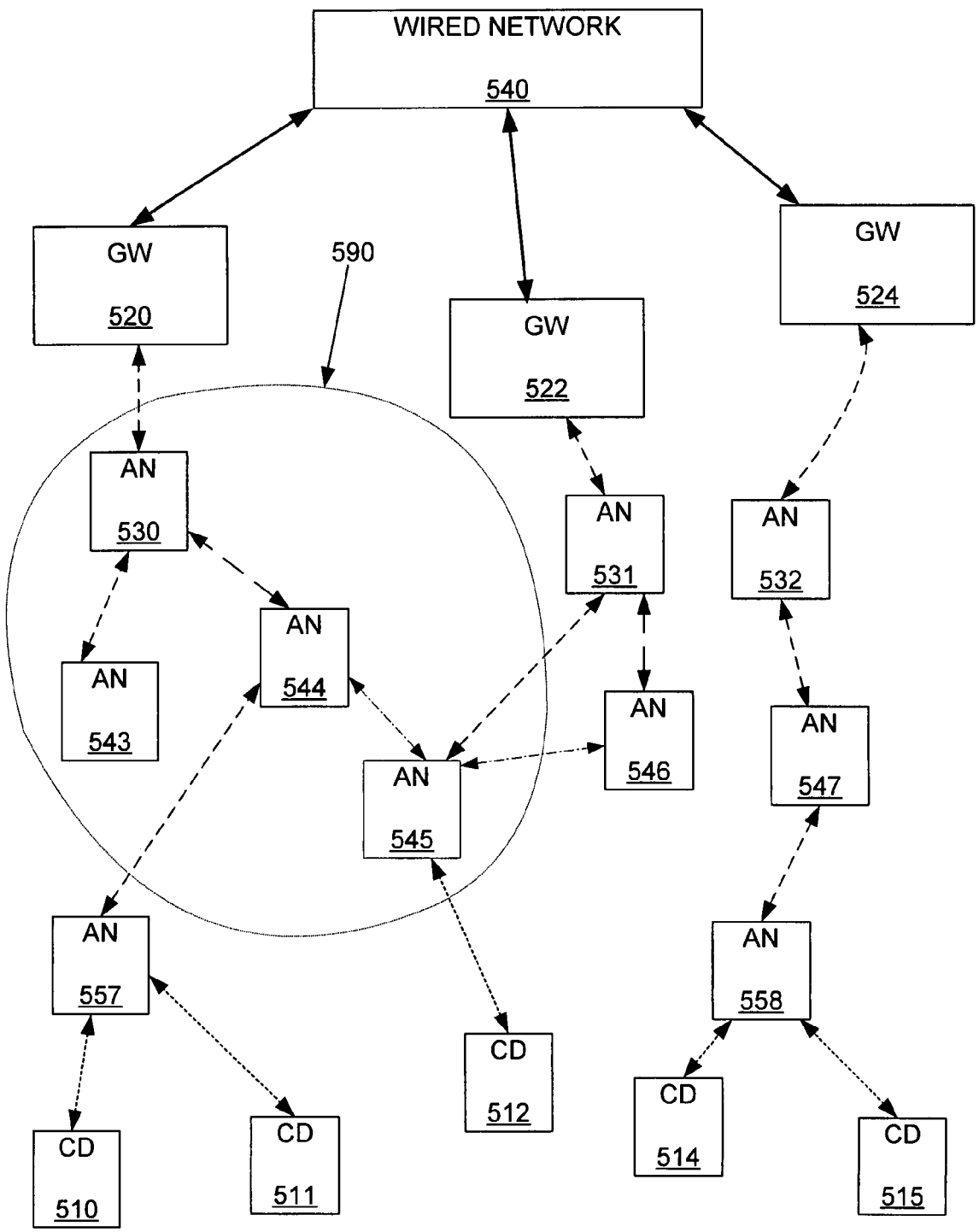
FIG. 5 shows an example of a wireless mesh network that can utilize methods of characterizing uncoordinated interference.

FIG. 5 shows an example of a wireless mesh network that can utilize methods of characterizing uncoordinated interference. The wireless mesh network includes gateways 520, 522, 524, access nodes 530, 531, 532, 543, 544, 545, 546, 547, 557, 558 and client devices 510-515. The wireless access nodes 530, 531, 532, 543, 544, 545, 546, 547, 557, 558 interconnect with each other, and with gateways 520, 522, 524 to form a mesh.

One embodiment of a gateway originates routing beacons that the access nodes can use to select routes to at least one gateway based on a persistence of successfully received routing beacons. The gateways typically include a backhaul (wired or wireless) to a wired network 540 that provides access to the internet.

An access node can generally be defined as being a device that a client device can associate with to obtain access to the mesh network, and therefore, access the internet. Typically, a gateway can additionally operate as an access node. One embodiment of an access node re-broadcasts successfully received routing beacons (from either an upstream gateway or access node) after attaching their own air-time usage information.

A client generally can include a laptop computer, a personal digital assistant (PDA), a cell-phone, or any other device that includes an interface card adaptable for use with the mesh network of the invention. The client can access the network though wired or wireless connections.

The access nodes 530, 531, 532, 543, 544, 545, 546, 547, 557, 558 form routing paths through the wireless mesh network. Client devices 510-515 wirelessly connect to any one of the gateways 520, 522, 524 or access nodes 530, 531, 532, 543, 544, 545, 546, 547, 557, 558 to obtain a data path to the wired network 540. An embodiment of the access nodes selects routing paths to at least one gateway based on a persistence of successfully received routing beacons, and on air-time usage information included within the routing beacons.

The example of a wireless mesh network of FIG. 5 includes the three gateways 520, 522, 524. Each gateway 520, 522, 524 defines a cluster. For example, a first cluster of the gateway 520 includes access nodes 530, 543, 544, 557. A second cluster of the gateway 522 includes access nodes 531, 545, 546. A third cluster of the gateway 524 includes the access nodes 532, 547, 558.

Due to the interconnectivity present in any mesh network, activities or conditions of one part of the mesh network can influence the operation of other parts of the mesh network. Additionally, the interconnections are wireless links, and therefore, the air-time occupied by wireless links of each of the access nodes 530, 531, 532, 543, 544, 545, 546, 547, 557, 558 and client device 510-515 can affect the operation of other devices of the mesh network because air-time is shared among all interfering links.

Depending upon the physical locations of the access nodes, certain access nodes are more likely to interfere with other nodes of the wireless network. Neighbor nodes can be defined as other nodes that can receive signals from a node, wherein the received signals at least have a predetermined signal strength. Neighboring nodes can be a source of self-interference, and can cause the air-time available to a node to fall below desirable levels. For example, the access node 544 has a "range" 590 surrounding the access node 544 that indicates, for example, a range in which neighboring access node located within the range can interfere with the access node 544. That is, typical signal attenuation of interfering signal transmitted within this range can be received by the access node 544, and therefore, can be uncoordinated interference. As shown, several access nodes are located within the range 590 and can cause uncoordinated interference. As shown, the access node 543 has selected a routing path through the access node 530. However, the access node 543 and its upstream access node 530 are within the range 590. Therefore, it is very likely that the wireless transmissions between the access node 543 and the access node 530 will occupy air-time of the access node 544.

Air-time is additionally occupied when client devices 510-515 are connected to the wireless mesh network. The time occupied by each client device connection is generally not equal. That is, the air-time occupied can vary greatly from client device to client device. Generally, the air-time occupied by a client device is dependent upon the qualities of the links between the client device and the gateway the client device is routed to, and the number of wireless hops (a hop is a wireless link) between the client device and the gateway. The more wireless hops a client device or node is away from a gateway, the greater the effect a client device or node can have on the available air-time capacity. That is, each link between the client device or node and the connecting gateway occupies air-time.

Generally, a range exists around an access node such that wireless links within this range can reduce the air-time available to the access node. Medium access protocols, such as, IEEE 802.11, implement Carrier Sense Multiple Access with Collision Avoidance (CSMA/CA). In such protocols, transceivers sense a channel and defer transmissions while the channel is considered to be busy. The channel is deemed to be busy if a received signal exceeds a Clear Channel Assessment Threshold (CCAT). Therefore, if the access node is receiving transmitted signals from at least one wireless device, the access node may be unable to either transmit any signal or receive any signal from another wireless device. As such, at some point the available air-time can become so limited that the access node cannot properly operate within the wireless mesh network.

An embodiment includes each access node and gateway within the wireless mesh network monitoring its air-time usage and exchanging its air-time usage with it neighboring access nodes and gateways. Based on the air-time usage histories, each access node can make more informed transmission and routing selections. For example, the access node 545 is shown to have three possible routing selections. The three possible routing selections are through one of the possible upstream access nodes 544, 531, 546. An initial selection can be based on a persistence of successfully received routing beacons from each of the potential upstream access nodes 544, 531, 546. However, after making a routing selection, the access node 545 could reselect a new route based at least in part on monitored air-time usage histories.

Figure 6:
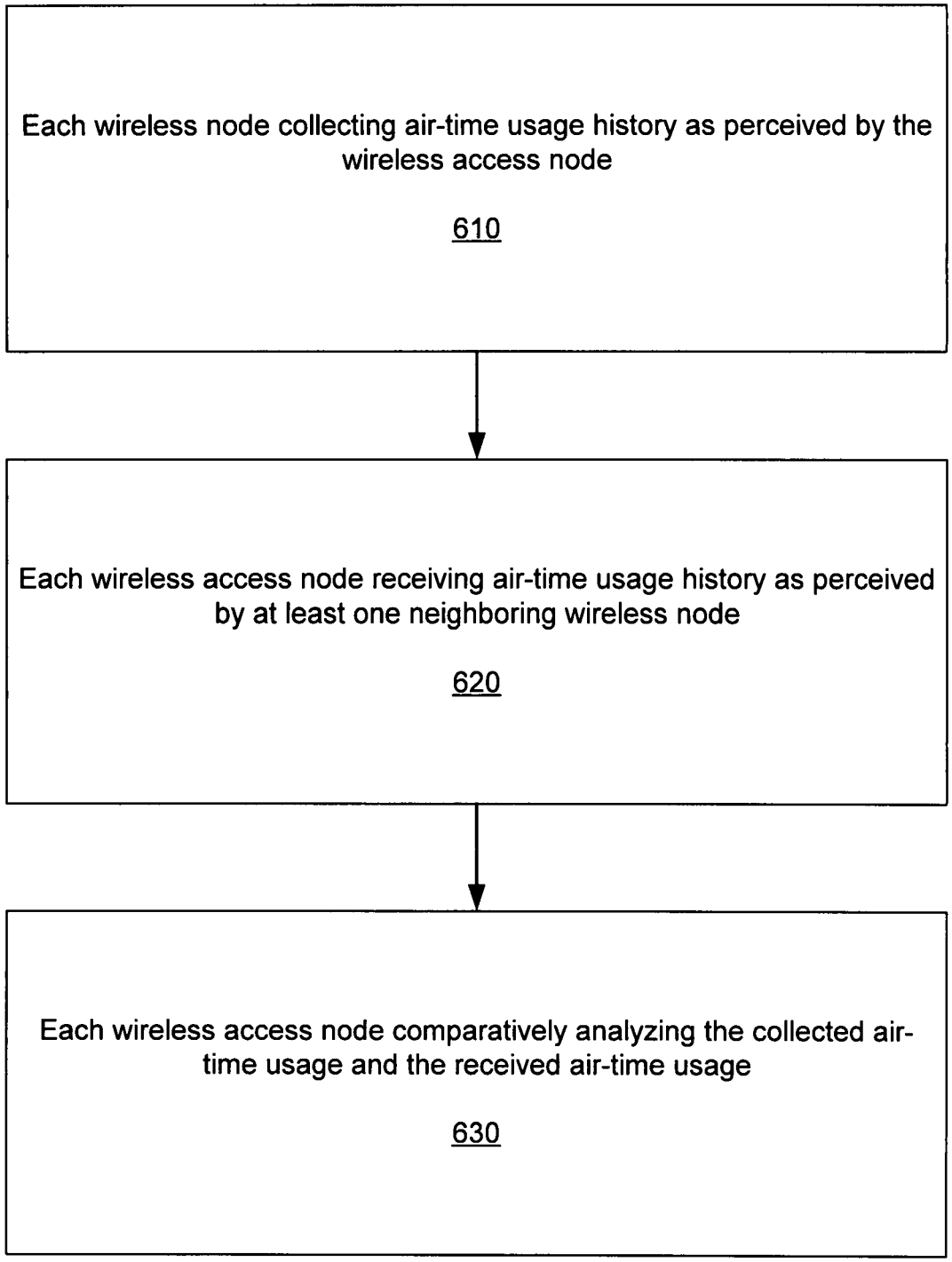
FIG. 6 is a flow chart that shows an example of steps of a method of a wireless mesh network characterizing uncoordinated, interference.

FIG. 6 is a flow chart that shows an example of steps of a method of a wireless mesh network characterizing uncoordinated interference. A first step 610 includes each wireless node within the wireless mesh network collecting air-time usage history as perceived by the wireless access node. A second step 620 includes each wireless node within the wireless mesh network receiving air-time usage history as perceived by at least one neighboring wireless node. A third step 630 includes each wireless access node comparatively analyzing collected air-time usage and the received air-time usage.

As previously described, one embodiment of wireless mesh networks includes gateways and wireless access nodes. Each gateway broadcasts routing beacons, and access node re-broadcasting successfully received routing beacons. An embodiment includes the routing beacons including at least part of the comparatively analyzed collected air-time usage and the received air-time usage of the gateway. Additionally, each access node that selects a routing path to the gateway, re-broadcasting the routing beacons after attaching the comparatively analyzed collected air-time usage and the received air-time usage of the access node.

Downstream access nodes can select the routing path to the gateway based at least in part on collected air-time usage and the received air-time usage of the access node of an upstream wireless node. That is, the gateway and access nodes each broadcasts their air-time usage information, wherein the air-time usage information includes at least in part the collected air-time usage and the received air-time usage. The broadcasting, as previously described, can be within routing packets which are received by downstream access node, and used by the downstream access nodes to select routing paths to at least one gateway.

Although specific embodiments have been described and illustrated, the described embodiments are not to be limited to the specific forms or arrangements of parts so described and illustrated. The described embodiments are limited only by the appended claims.

What is claimed:

1. A method of a wireless access node within a network characterizing uncoordinated interference, comprising:
   the wireless access node collecting air-time usage history at the wireless access node, comprising the wireless access node receiving and monitoring signals over time that are greater than a threshold;
   the wireless access node receiving air-time usage history of at least one neighboring wireless node, wherein the air-time usage history of the at least one neighboring wireless node is obtained by the at least one neighboring wireless node monitoring over time, signals received by the at least one neighboring node greater than a threshold;
   the wireless access node estimating an impact of uncoordinated interference, comprising comparatively analyzing the collected air-time usage of the wireless access node and the received air-time usage of the at least one neighboring wireless node, comprising synchronizing the collected air-time usage of the wireless access node and the received air-time usage of the at least one neighboring wireless node, and generating a histogram of available air-time based on the comparative analysis; and
   the wireless access node identifying gaps of the available air-time based at least in part on the comparative analysis, and increasing its transmission bit rate and number of transmitted data packets during the identified gaps.

2. The method of claim 1, further comprising estimating a link quality between the wireless node and at least one neighboring node based on the comparative analysis.

3. The method of claim 2, wherein the network is a wireless mesh network, and the method further comprises the wireless node selecting a routing path to an upstream gateway at least in part based upon the link quality between the wireless node and the neighboring node.

4. The method of claim 1, wherein synchronizing the collected air-time usage and the received air-time usage comprises correlating the collected air-time usage with the received air-time usage.

5. The method of claim 1, wherein synchronizing the collected air-time usage and the received air-time usage comprises XORing the collected air-time usage with the received air-time usage with several different time offsets.

6. The method of claim 1, further comprising selecting a transmission power based at least in part on the comparative analysis.

7. The method of claim 1, further comprising controlling fragmentation of transmission data packets based at least in part on the comparative analysis.

8. The method of claim 1, wherein the wireless node is part of a wireless mesh network, and the method further comprises the wireless node broadcasting air-time usage information of the wireless node, the air-time usage information comprised at least in part on the collected air-time usage and the received air-time usage.

9. The method of claim 8, further comprising the wireless node broadcasting the air-time usage information within routing packets.

10. The method of claim 8, further comprising the wireless node receiving routing packets from neighboring nodes, wherein the received routing packet comprise at least in part, air-time usage information of the neighboring node.

11. The method of claim 10, wherein the wireless node selects a routing path to a routing packet originating gateway based at least in part on characteristics of routing packets received from the neighboring nodes, and the comparative analysis of the collected air-time usage and the received air-time usage.

12. The method of claim 1, wherein the wireless access node collecting air-time usage history at the wireless access node further comprises the wireless access node receiving and monitoring signals over time that are greater than a plurality of thresholds.

13. The method of claim 1, wherein the wireless access node receiving air-time usage history of at least one neighboring wireless node comprises the wireless access node receiving the air-time usage history of the at least one neighboring wireless node, wherein the air-time usage history of the at least one neighboring wireless node is obtained by the at least one wireless node monitoring over time, signals received by the at least one neighboring node greater than a plurality of thresholds.

14. A method of a wireless mesh network characterizing uncoordinated interference, the wireless mesh network comprising a gateway, and a plurality of wireless nodes, the method comprising:
   each wireless node within the wireless mesh network collecting air-time usage history at the wireless node, comprising the wireless node receiving and monitoring signals over time that are greater than a threshold;
   each wireless node and the gateway within the wireless mesh network receiving air-time usage history of at least one neighboring wireless node, wherein the air-time usage history of the at least one neighboring wireless node is obtained by the at least one neighboring wireless node monitoring over time, signals received by the at least one neighboring node greater than a threshold;
   each wireless access node and the gateway comparatively analyzing collected air-time usage and the received air-time usage;
   the gateway broadcasting routing beacons, the routing beacons comprising at least part of the comparatively analyzed collected air-time usage and the received air-time usage of the gateway; and
   each access node that selects a routing path to the gateway, re-broadcasting the routing beacons after attaching the comparatively analyzed collected air-time usage and the received air-time usage of the access node.

15. The method of claim 14, wherein each access node selects the routing path to the gateway based at least in part on collected air-time usage and the received air-time usage of an upstream wireless node or the gateway.

16. A wireless access node, wherein the wireless access node is operative to:
- collect air-time usage history at the wireless access node, comprising the wireless access node receiving and monitoring signals over time that are greater than a threshold;
- receive air-time usage history of at least one neighboring wireless node, wherein the air-time usage history of the at least one neighboring wireless node is obtained by the at least one wireless node monitoring over time, signals received by the at least one neighboring node greater than a threshold;
- estimate an impact of uncoordinated interference, comprising comparatively analyzing the collected air-time usage of the wireless access node and the received air-time usage of the at least one neighboring wireless node, comprising synchronizing the collected air-time usage of the wireless access node and the received air-time usage of the at least one neighboring wireless node, and generating a histogram of available air-time based on the comparative analysis; and
- identify gaps of the available air-time based at least in part on the comparative analysis, and increase its transmission bit rate and number of transmitted data packets during the identified gaps.

17. A wireless access node, wherein the wireless access node is operative to:
- collect air-time usage history at the wireless access node, comprising the wireless access node receiving and monitoring signals over time that are greater than a threshold;
- receive air-time usage history of at least one neighboring wireless node, wherein the air-time usage history of the at least one neighboring wireless node is obtained by the at least one wireless node monitoring over time, signals received by the at least one neighboring node greater than a threshold;
- estimate an impact of uncoordinated interference, comprising comparatively analyzing the collected air-time usage of the wireless access node and the received air-time usage of the at least one neighboring wireless node, comprising synchronizing the collected air-time usage of the wireless access node and the received air-time usage of the at least one neighboring wireless node, and generating a histogram of available air-time based on the comparative analysis; and
- identify a frequency and occurrence of slots of available air-time based at least in part on the comparative analysis, fragment its data packets, and transmit the fragmented data packets according to the slots of available air-time.

* * * * *